(12) United States Patent
Fukuchi (10) Patent No.: US 11,870,245 B2
(45) Date of Patent: Jan. 9, 2024

(54) SURGE SUPPRESSION DEVICE AND MOTOR WIRING COMPONENT

(71) Applicant: Hitachi Metals, Ltd., Tokyo (JP)

(72) Inventor: Keisuke Fukuchi, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 69 days.

(21) Appl. No.: 17/677,530

(22) Filed: Feb. 22, 2022

(65) Prior Publication Data
US 2022/0294210 A1     Sep. 15, 2022

(30) Foreign Application Priority Data

Mar. 12, 2021 (JP) ................................. 2021-039815

(51) Int. Cl.
*H02H 9/04* (2006.01)

(52) U.S. Cl.
CPC ..................................... *H02H 9/04* (2013.01)

(58) Field of Classification Search
CPC ............ H02H 9/04; H02H 9/041; H02H 7/09; H02K 11/20
USPC .......................................................... 361/33
See application file for complete search history.

(56) References Cited

U.S. PATENT DOCUMENTS

| 5,831,410 | A | * | 11/1998 | Skibinski | H02J 3/01 |
| | | | | | 318/434 |
| 7,848,122 | B2 | * | 12/2010 | Tallam | H02M 1/126 |
| | | | | | 363/39 |
| 11,394,329 | B2 | * | 7/2022 | Popek | H02M 3/1582 |
| 2009/0267431 | A1 | * | 10/2009 | Tallam | H03H 7/427 |
| | | | | | 310/71 |
| 2012/0014143 | A1 | * | 1/2012 | Schueneman | H02M 1/126 |
| | | | | | 363/40 |
| 2019/0068095 | A1 | * | 2/2019 | von Sebo | H02P 7/06 |

FOREIGN PATENT DOCUMENTS

| EP | 2408093 A2 * | 1/2012 | ............ H02M 1/126 |
| JP | 2014-132811 A | 7/2014 | |

* cited by examiner

*Primary Examiner* — Dharti H Patel
(74) *Attorney, Agent, or Firm* — Thomas W. Cole; Calderon Safran & Cole P.C.

(57) ABSTRACT

A surge suppression device includes a plurality of series circuits each of which is composed of a resistor and a capacitor, a case in which a plurality of the resistors and a plurality of the capacitors are placed, wherein respective ends of the plurality of series circuits on the capacitor side are electrically connected to each other via a connection electrode provided on the case. A motor wiring component includes a plurality of conductive wires connected to stator coils of the motor, wiring terminals that are provided at ends of the plurality of conductive wires on a side opposite to the side connected to the stator coils and are connected to electrodes of a terminal block, and the surge suppression device.

5 Claims, 9 Drawing Sheets

SURGE SUPPRESSION DEVICE AND MOTOR WIRING COMPONENT

CROSS-REFERENCE TO RELATED APPLICATIONS

The present patent application claims the priority of Japanese patent application No. 2021-039815 filed on Mar. 12, 2021, and the entire contents thereof are hereby incorporated by reference.

TECHNICAL FIELD

The present invention relates to a surge suppression device and a motor wiring component (i.e., wiring component for motor).

BACKGROUND ART

A motor wiring member configured to supply three phase AC currents from an inverter to a motor has been known. The motor wiring member includes plural conductive wires and connects coil ends of a stator to electrodes of a terminal block in the motor.

The inverter outputs a pulsed voltage modulated by pulse width modulation (PWM). At a rise of this pulsed voltage, surge voltage may occur and overvoltage may be applied to the motor. For this reason, a surge suppression unit is being used to suppress such surge voltage and thereby suppress application of overvoltage to the motor (see, e.g., Patent Literature 1).

The surge suppression unit described in Patent Literature 1 has three series circuits each composed of a resistor and a capacitor, and the three series circuits are arranged in such a manner that their ends on the capacitor side are connected to each other. The three series circuits are housed in a housing.

CITATION LIST

Patent Literature

Patent Literature 1: JP 2014-132811A

SUMMARY OF THE INVENTION

However, the Patent Literature 1 does not provide any description of how three series circuits arranged in the housing are electrically connected to each other, hence, there is room for improvement in the surge suppression unit described in Patent Literature 1 from the viewpoint of facilitating work of electrical connection between plural series circuits arranged in the housing and thereby improving productivity.

The invention was made in view of such circumstances and it is an object of the invention to provide a surge suppression device and a motor wiring component which can improve productivity.

So as to achieve the above object, one aspect of the invention provides: a surge suppression device, comprising:
a plurality of series circuits each comprising a resistor and a capacitor; and
a case in which a plurality of the resistors and a plurality of the capacitors are placed,
wherein respective ends of the plurality of series circuits on the capacitor side are electrically connected to each other via a connection electrode provided on the case.

Further, so as to achieve the above object, another object of the invention provides: a motor wiring component to supply an alternating current to a motor, the motor wiring component comprising:
a plurality of conductive wires connected to stator coils of the motor;
wiring terminals that are provided at ends of the plurality of conductive wires on a side opposite to the side connected to the stator coils and are connected to electrodes of a terminal block; and
a surge suppression device to suppress application of overvoltage to the motor,
wherein the surge suppression device comprises a plurality of series circuits each comprising a resistor and a capacitor, and a case in which a plurality of the resistors and a plurality of the capacitors are placed,
wherein respective ends of the plurality of series circuits on the resistor side are respectively electrically connected to the conductive wires for respective phases, and
wherein respective ends of the plurality of series circuits on the capacitor side are electrically connected to each other via a connection electrode provided on the case.

BEST MODE FOR CARRYING OUT THE INVENTION

Embodiment

An embodiment of the invention will be described in reference to FIGS. 1 to 11. The embodiment below is described as a preferred example for implementing the invention. Although some part of the embodiment specifically illustrates various technically preferable matters, the technical scope of the invention is not limited to such specific aspects.

(Description of Motor 11)

Figure 1:
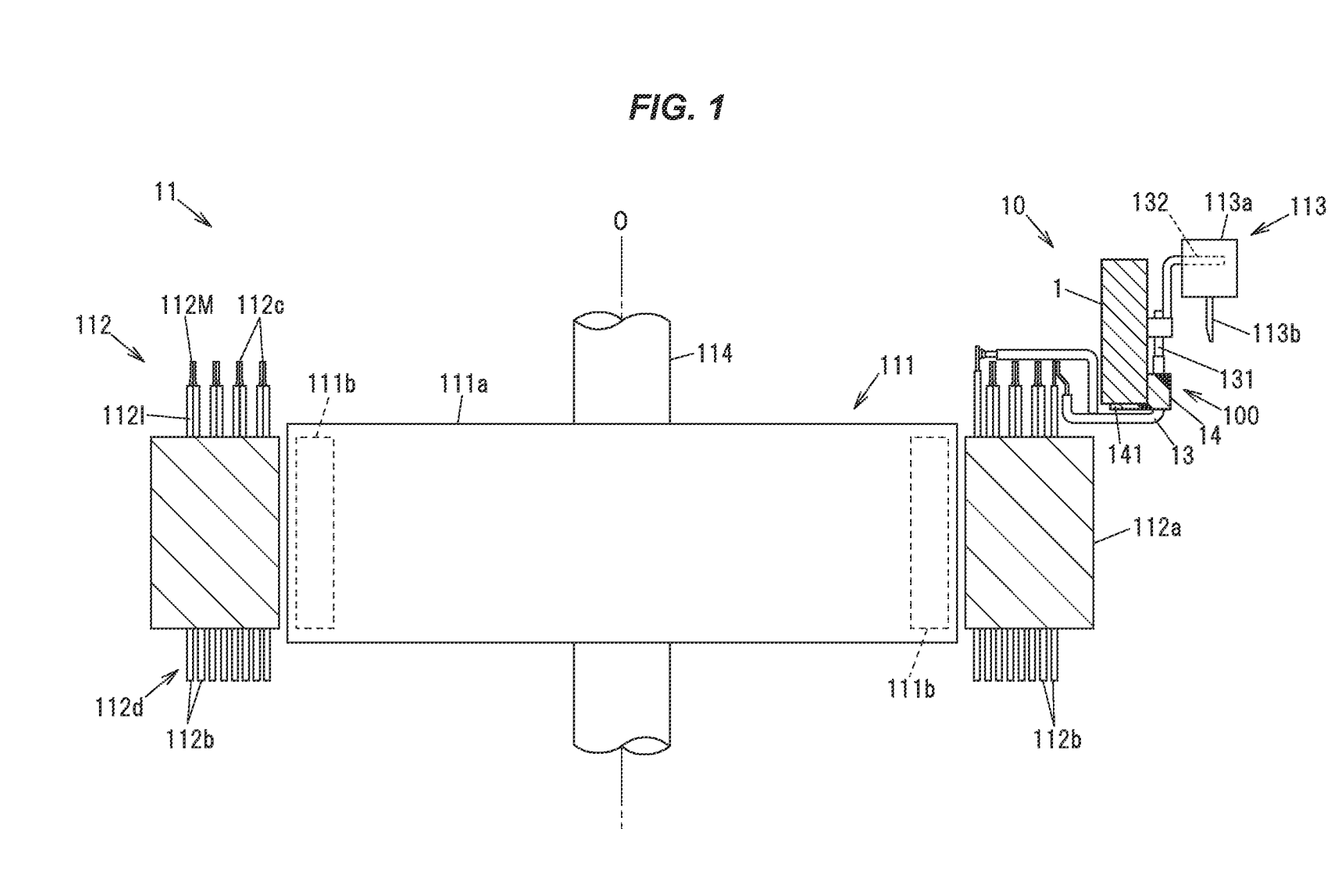
FIG. 1 is a schematic diagram illustrating an overall configuration of a motor including a motor wiring component in an embodiment.

FIG. 1 is a schematic diagram illustrating an overall configuration of a motor 11 including a wiring component 10 for motor. The motor 11 is mounted on a vehicle driven by electric power, such as electric vehicle or hybrid vehicle.

The motor 11 includes a rotor 11, a stator 112 arranged to surround the rotor 111, and a terminal block 113. The rotor 111 is formed by embedding plural magnets 111b in a rotor core 111a made of a soft magnetic metal and rotates with a shaft 114 inserted through the center. The stator 112 has a stator core 112a made of a soft magnetic metal and plural coil pieces 112b.

In the following description, a direction passing a rotational axis O and perpendicular to the rotational axis O is referred to as a radial direction, and a rotational direction of the shaft 114 is referred to as a circumferential direction.

The stator core 112a integrally has a cylindrical back yoke and plural teeth protruding inward in the radial direction from the back yoke, even though it is not shown in the drawing. Slots are formed between the teeth adjacent in the circumferential direction. The coil pieces 112b are respectively housed and held in the slots of the stator core 112a.

The coil piece 112b has a conductive metal 112M having high conductivity such as copper or aluminum, and an electrically insulating covering layer 112I covering the surface of the conductive metal 112M. In the present embodiment, the conductive metal 112M is a rectangular solid wire having a rectangular cross-sectional shape, and the covering layer 112I is formed of an enamel coating. At coil ends 112c which are end portions of the coil pieces 112b, the covering layer 112I is stripped and the conductive metal 112M is exposed. The coil ends 112c of each coil piece 112b are welded to each other, and two sets of three-phase (U-phase, V-phase and W-phase) stator coils 112d with electrical angle phases shifted by a predetermined angle are formed.

The motor 11 includes a housing (not shown) which houses the stator 112, and the terminal block 113 fixed to the housing. The terminal block 113 has a base 113a made of a resin and fixed to the housing, and three electrodes 113b to which three phase alternating currents (pulsed signals by pulse-width modulation) are supplied from the inverter.

The motor 11 further includes the wiring component 10 for motor in the present embodiment. The wiring component 10 for motor is a member to connect the coil ends 112c of the stator 112 to the electrodes 113b of the terminal block 113 and supplies the three phase alternating currents, which are supplied from the inverter via the electrodes 113b of the terminal block 113, to the stator coils 112d for the respective phases of the motor 11.

(Motor Wiring Component 10)

Figure 2:
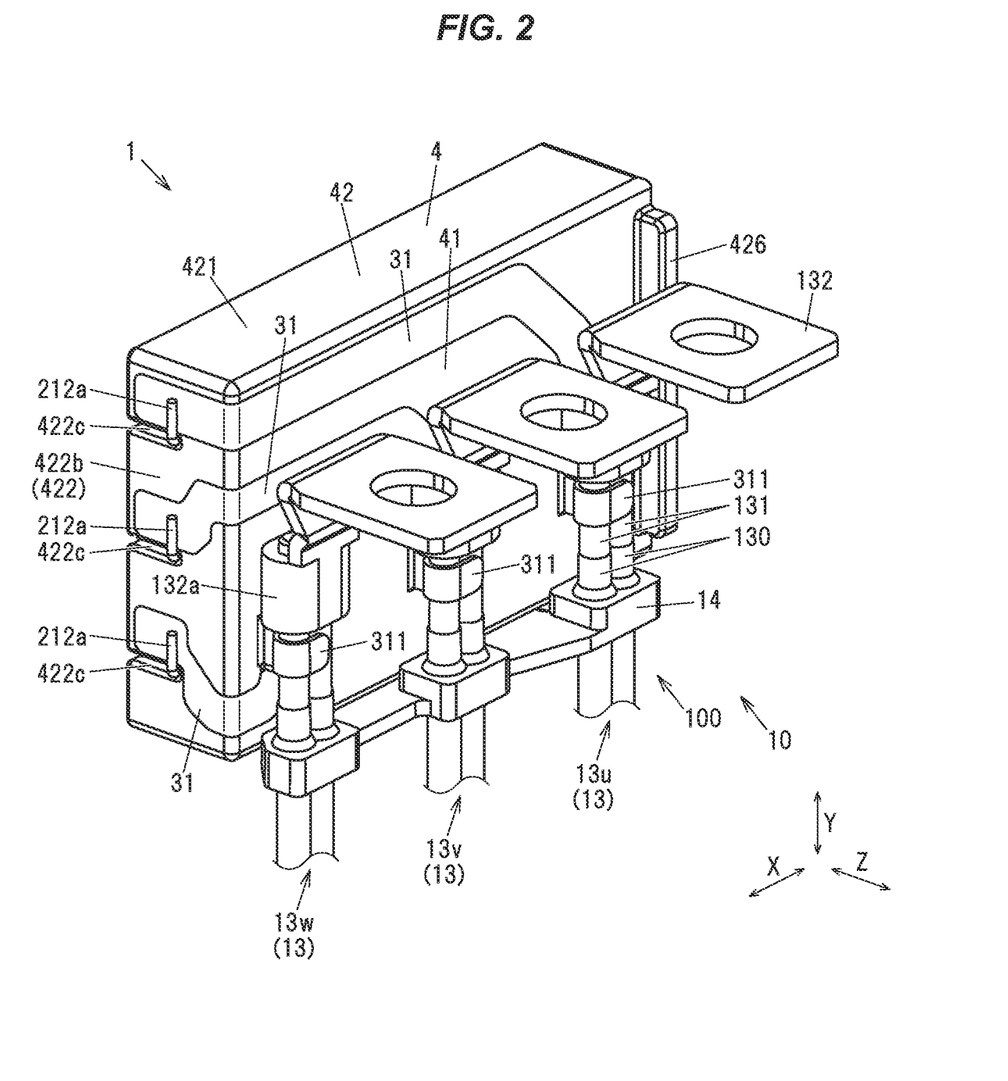
FIG. 2 is a first perspective view showing the motor wiring component including a surge suppression device in the embodiment.
Figure 3:
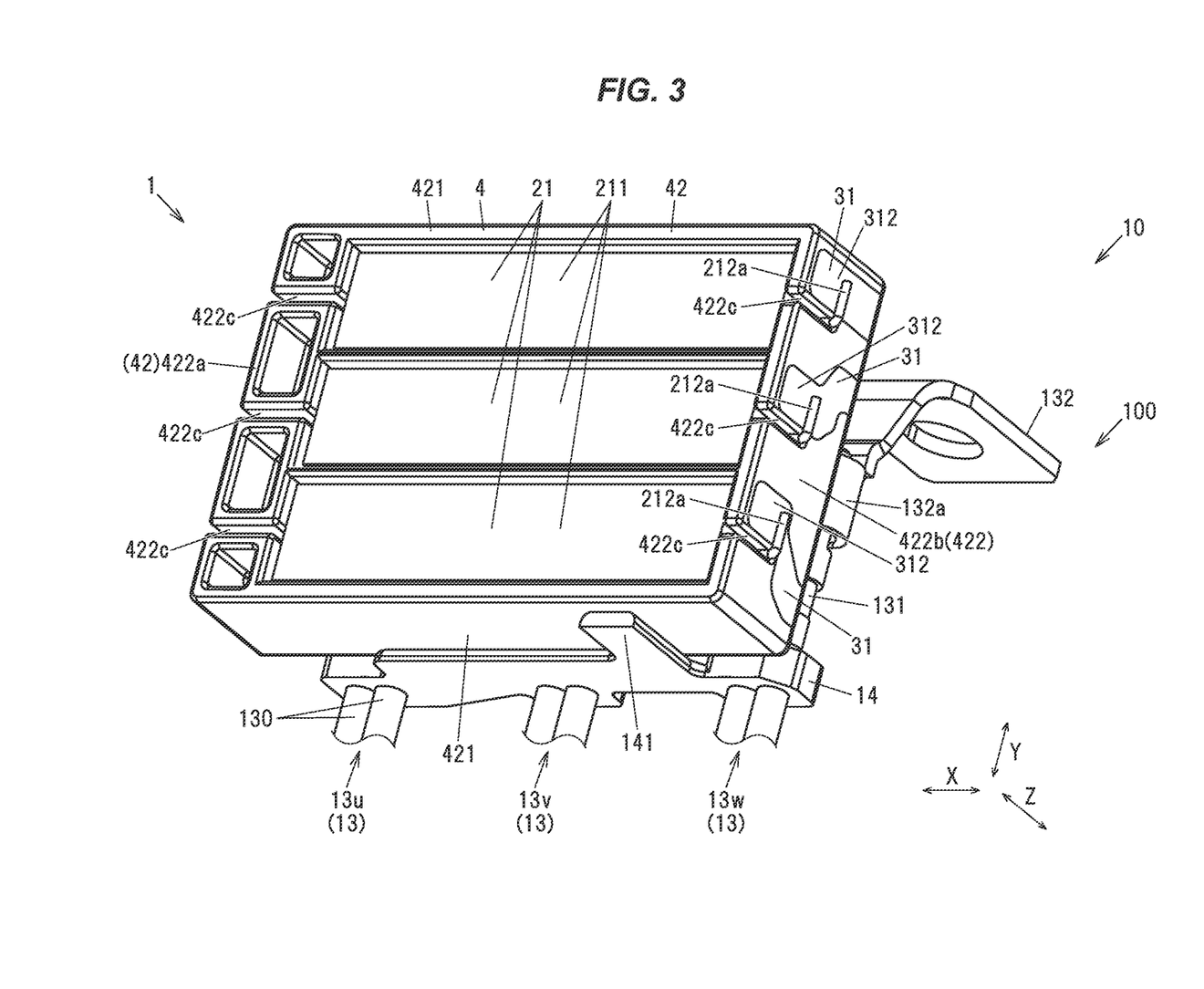
FIG. 3 is a second perspective view showing the motor wiring component including the surge suppression device in the embodiment.
Figure 4:
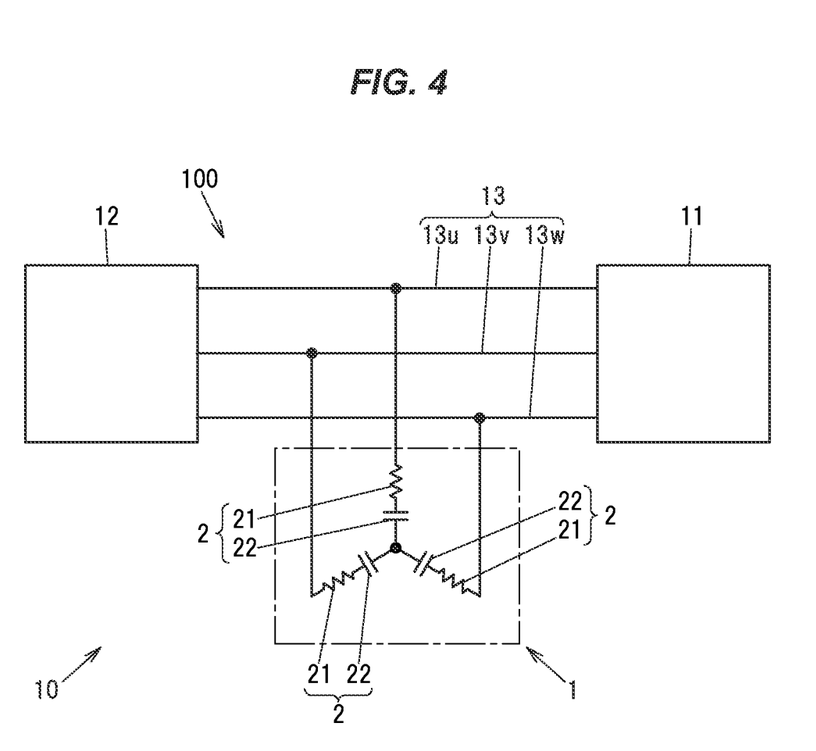
FIG. 4 is a circuit diagram illustrating the motor wiring component in the embodiment.

FIG. 2 is a first perspective view showing the wiring component 10 for motor including a surge suppression device 1. FIG. 3 is a second perspective view showing the wiring component 10 for motor including the surge suppression device 1. FIG. 4 is a circuit diagram illustrating the wiring component 10 for motor.

The surge suppression device 1 in the present embodiment suppresses application of surge voltage to the motor 11 and constitutes a part of the wiring component 10 for motor, as shown in FIGS. 2 and 3. The wiring component 10 for motor is formed by assembling the surge suppression device 1 to a wiring unit 100. As shown in FIG. 4, the wiring unit 100 constitutes wiring to electrically connect the motor 11 to an inverter 12. The wiring unit 100 has a U-phase wiring portion 13u through which a U-phase current output from the inverter 12 flows, a V-phase wiring portion 13v through which a V-phase current output from the inverter 12 flows, and a W-phase wiring portion 13w through which a W-phase current output from the inverter 12 flows. The wiring unit 100 also includes a holder 14 that holds the U-phase wiring portion 13u, the V-phase wiring portion 13v and the W-phase wiring portion 13w, as shown in FIGS. 2 and 3. Hereinafter, when the U-phase wiring portion 13u, the V-phase wiring portion 13v and the W-phase wiring portion 13w are not specifically distinguished, they are simply referred to as the wiring portions 13.

Each wiring portion 13 includes two conductive wires 131 electrically connected at one end to the coil ends 1/2c of the stator 112 of the motor 11, and a wiring terminal 132 crimped to the other ends of the two conductive wires 131. The ends of the two conductive wires 131 of the wiring portion 13 at the one end are respectively connected to the two sets of stator coils 112d of each phase wound around the stator core 112a. The other ends of the two conductive wires 131 of the wiring portion 13 are inserted together into a barrel 132a of the wiring terminal 132 and are fixed to the wiring terminal 132 by swaging the barrel 132a toward the two conductive wires 131. The wiring terminal 132 is connected to the electrode 113b of the terminal block 113. Portions of the conductive wires 131 other than both ends are covered with insulating sheaths 130.

The holder 14 integrates the three wiring portions 13. The holder 14 is made of, e.g., a thermoplastic resin and is integrally formed with the three wiring portions 13 by insert molding performed in such a manner that a molten resin is injected into and cured in a mold in which respective portions of the three wiring portions 13 are arranged. The resin constituting the holder 14 can be, e.g., a PPS (polyphenylene sulfide) resin.

As shown in FIG. 3, the holder 14 has a placement portion 141 which protrudes in one direction and on which the surge suppression device 1 is placed. The surge suppression device 1 is placed on the placement portion 141. In the present embodiment, the surge suppression device 1 is placed on the placement portion 141 and is fixed to the wiring unit 100 by connecting three terminal portions 311 (described later) to the three wiring portions 13. The method for fixing the surge suppression device 1 to the wiring unit 100 is not limited thereto, and, e.g., a snap-fit engagement piece may be formed on a case 4 (described later) of the surge suppression device 1 so that the surge suppression device 1 can be fixed to the holder 14 by snap-fitting. It can also be configured such that the surge suppression device 1 and the holder 14 are slid to engage with each other.

(Surge Suppression Device 1)

Figure 5:
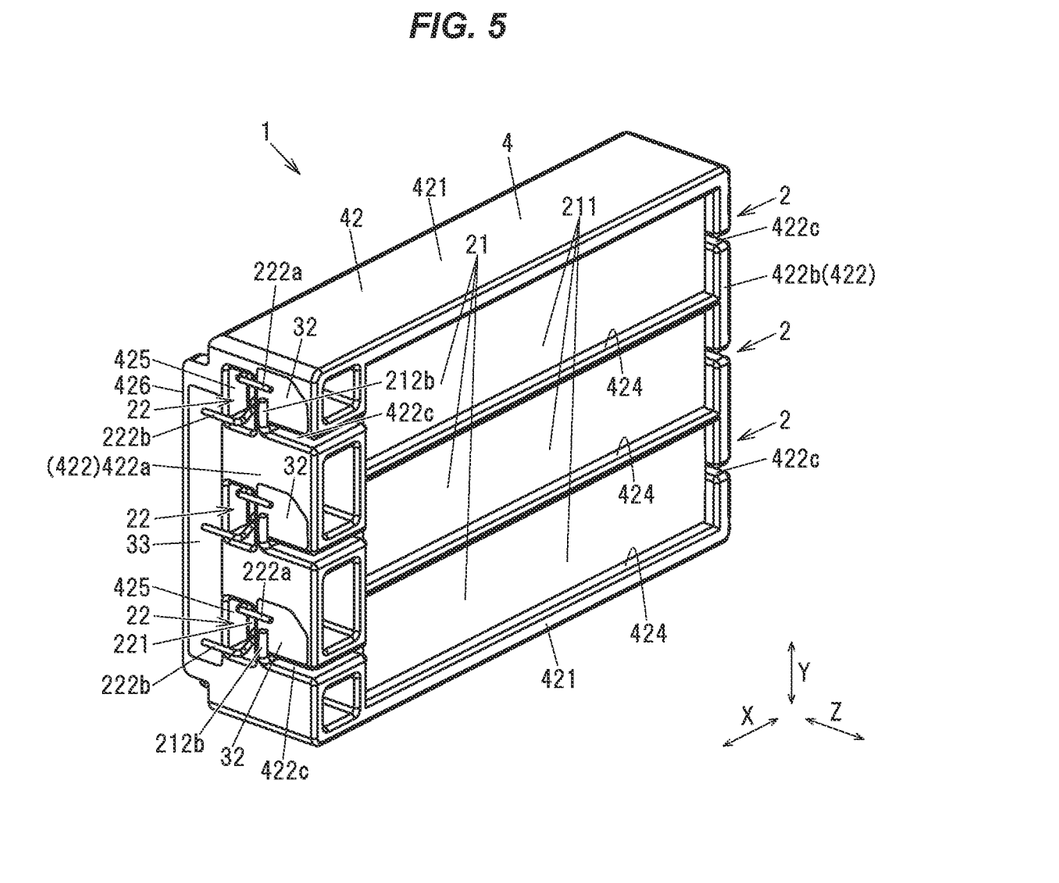
FIG. 5 is a first perspective view showing the surge suppression device in the embodiment.
Figure 6:
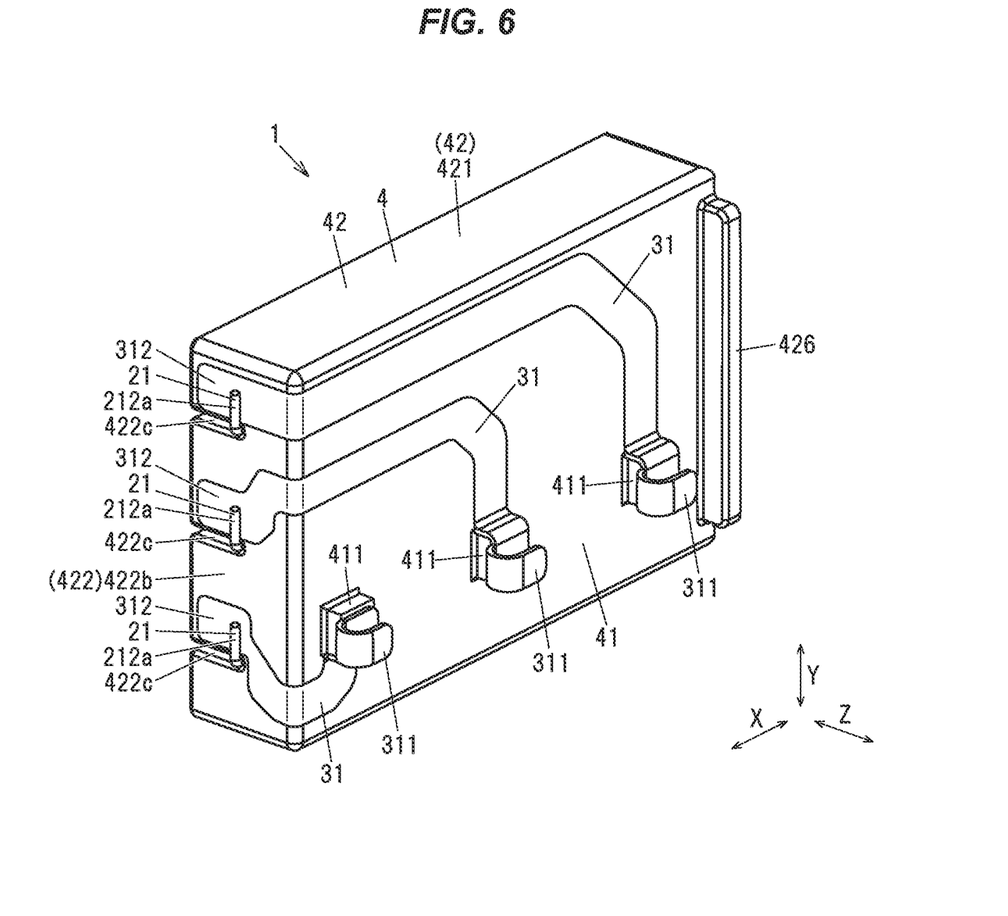
FIG. 6 is a second perspective view showing the surge suppression device in the embodiment.
Figure 7:
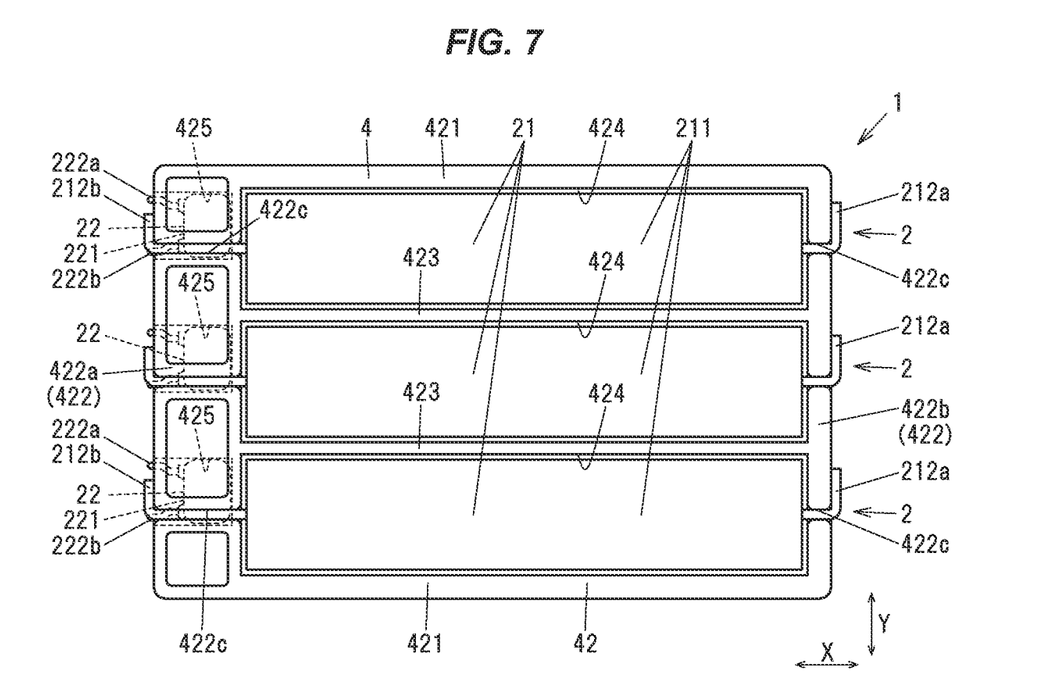
FIG. 7 is a front view showing the surge suppression device in the embodiment.
Figure 8:
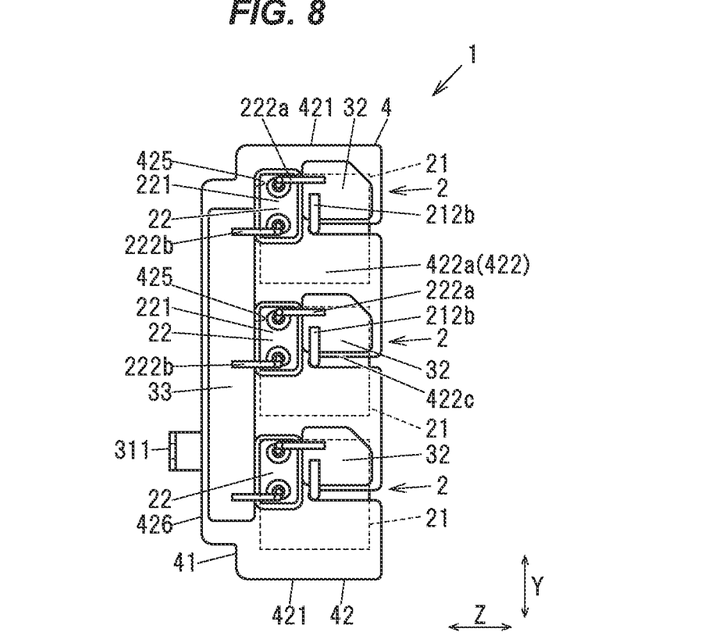
FIG. 8 is a side view showing the surge suppression device in the embodiment.
Figure 9:
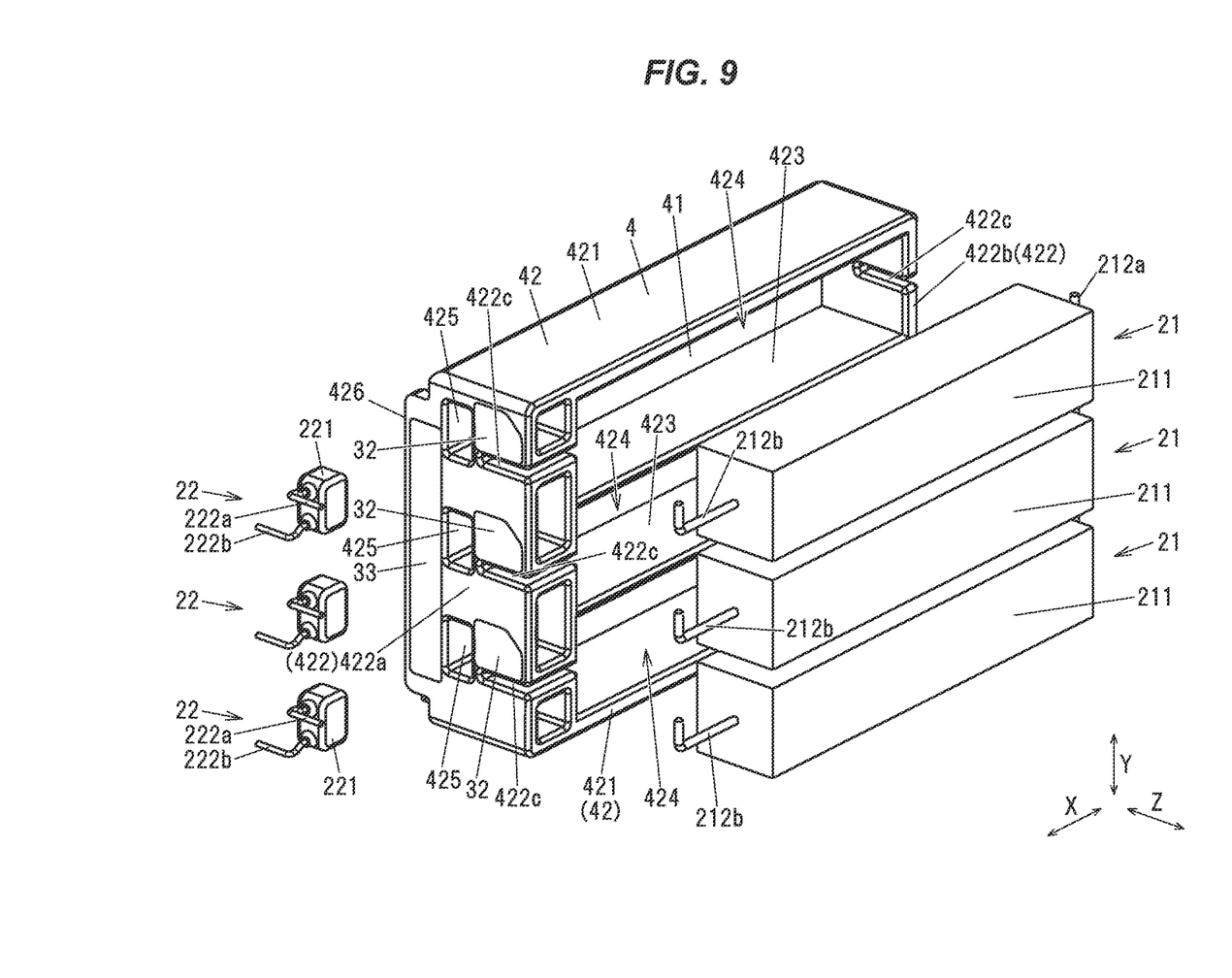
FIG. 9 is an exploded perspective view showing the surge suppression device in the embodiment.

FIG. 5 is a first perspective view showing the surge suppression device 1. FIG. 6 is a second perspective view showing the surge suppression device 1. FIG. 7 is a front view showing the surge suppression device 1. FIG. 8 is a side view showing the surge suppression device 1. FIG. 9 is an exploded perspective view showing the surge suppression device 1.

As shown in FIGS. 4, 5 and 6, the surge suppression device 1 has three series circuits 2 in each of which a resistor 21 and a capacitor 22 are connected in series. Ends of the series circuits 2 on the resistor 21 side are electrically connected to the conductive wires 131 for the respective phases. Meanwhile, ends of the three series circuits 2 on the capacitor 22 side are electrically connected to each other and thereby form a star connection. The surge suppression device 1 includes the three resistors 21, the three capacitors 22, and the case 4 integrally provided with electrodes with terminals 31 (i.e., terminal-attached electrodes 31), relay electrodes 32 and a connection electrode 33.

It is possible to use the resistor 21 made of, e.g., a conductive rubber or a conductive plastic. The resistor 21 can be formed by, e.g., inserting lead wires 212a, 212b respectively into both end portions of a resistor main body 211 made of a conductive rubber or a conductive plastic. However, the resistor 21 is not limited thereto. The resistor 21 may be composed of a pattern formed of a high-resistant material such as carbon, or the resistor 21 may be composed of a combination of leaded resistors used in electric circuits.

The resistor main body 211 of the resistor 21 is formed in a rectangular prism shape which is long in one direction, the lead wire 212a to be connected to the electrode with terminal 31 (described later) extends out from one side in a longitudinal direction thereof and the lead wire 212b to be connected to the capacitor extends out from the other side.

The capacitor 22 includes a capacitor main body 221 incorporating an element, and a pair of lead wires 222a, 222b that protrude from the capacitor main body 221 on the same side. The lead wire 222a is connected to the lead wire 212b of the resistor 21 via the relay electrode 32, and the lead wire 222b is connected to the connection electrode 33.

The pair of lead wires 212a, 212b of the resistor 21 and the pair of lead wires 222a, 222b of the capacitor 22 are bent into predetermined shapes, but this will be described later. The resistor 21 is housed in a resistor placement recess 424 (described late), and the capacitor 22 is housed in a capacitor placement recess 425 (described late).

The case 4 can be made of a resin with high thermal conductivity to dissipate heat of the resistors 21 and the capacitors 22 housed therein. In particular, the material constituting the case 4 can be an insulating and heat dissipating material obtained by mixing an engineering plastic such as PA 6 (polyamide 6) or PBT (polybutylene terephthalate), or a super engineering plastic such as PPS (polyphenylene sulfide), with a ceramic material having high insulation properties and high thermal conductivity (thermally conductive filler). Such insulating and heat dissipating materials have a high thermal conductivity of 1-10 W/m/K which is 5 to 50 times higher than thermal conductivity of common plastic materials (about 0.2 W/m/K).

The case 4 is formed in a shape of a rectangular plate which is a substantially rectangular shape when viewed in a thickness direction. Hereinafter, a longitudinal direction of the case 4 is referred to as an X direction, a lateral direction of the case 4 is referred to as a Y direction, and a direction which is orthogonal to both the X and Y directions and coincides with the thickness direction of the case 4 is referred to as a Z direction.

The case 4 has a rectangular plate-shaped bottom wall 41 having a thickness in the Z direction, and a side wall 42 rising upright from each side of the bottom wall 41 toward one side in the Z direction. The side wall 42 has a pair of lateral side walls 421 extending in the X direction and a pair of vertical side walls 422 extending in the Y direction. A first vertical side wall 422a which is one of the pair of vertical side walls 422 is formed to have a larger thickness than a second vertical side wall 422b which is the other vertical side wall 422.

In addition, two partition walls 423 are formed between the pair of lateral side walls 421 and divide a region surrounded by the bottom wall 41 and the side wall 42 into three regions. Each partition wall 423 is long in the X direction and is formed such that both ends in the X direction are connected to the pair of lateral side walls 421 and an end in the Z direction is connected to the bottom wall 41. The three resistor placement recesses 424 are formed by the bottom wall 41, the side wall 42 and the two partition walls 423.

The resistor placement recess 424 houses the capacitor main body 221 of the resistor 21. In the present embodiment, the capacitor main bodies 221 of the three resistors 21 are separately arranged in the different resistor placement recesses 424. The resistor placement recesses 424 are formed long in the X direction and is open on a side opposite to the bottom wall 41 in the Z direction. The three resistor placement recesses 424 are aligned in the Y direction. Although an example in which the three resistor main bodies 211 are respectively housed in the three resistor placement recesses 424 is described in the present embodiment, it is not limited thereto. It is possible to adopt a configuration in which, e.g., the partition walls 423 are removed from the case 4 in the present embodiment and the three resistor main bodies 211 are housed together in one large resistor placement recess.

Six lead-out recesses 422c through which the six lead wires 212a, 212b of the resistors 21 are respectively inserted are formed on the pair of vertical side walls 422. The lead-out recesses 422c are formed to allow the lead wires 212a, 212b of the resistors 21 arranged in the resistor placement recesses 424 to extend out of the case 4. The lead-out recesses 422c are formed to be open on the same side as the opening side of the resistor placement recesses 424 in the Z direction and penetrate the vertical side walls 422 in the X direction. Alternatively, e.g., the three lead-out recesses 422c formed on the second vertical side wall 422b may be integrated into one large recess into which the three lead wires 212a of the three resistors 21 are inserted together.

Three capacitor placement recesses 425 to respectively house the three capacitors 22 are formed on the first vertical side wall 422a. The three capacitor placement recesses 425 are recesses that are open on an outer surface of the first vertical side wall 422a. In this regard, the term "outer side" means a side toward which a distance from the inner side of the case increases, and the term "outer surface" means a surface facing the outer side. When viewed in the X direction, the three capacitor placement recesses 425 are each long in the X direction and are aligned in the Y direction, as shown in FIG. 8. As shown in FIG. 7, the capacitor placement recesses 425 are closed by a portion of the first vertical side wall 422a on the second vertical side wall 422b side in the X direction. That is, the capacitor placement recesses 425 do not communicate with the resistor placement recesses 424.

The capacitor placement recesses 425 are formed at positions farther away (i.e., being distant) on the bottom wall 41 side in the Z direction relative to the three lead-out recesses 422c formed on the first vertical side wall 422a. When viewed in the X direction, the three capacitor placement recesses 425 are formed at positions at which they overlap the different resistors 21 in the X direction. Each capacitor 22 is arranged such that the capacitor main body 221 is housed in the capacitor placement recess 425 and the pair of lead wires 222a, 222b extend from the capacitor placement recess 425 to the outside of the capacitor placement recess 425.

The case 4 also has a protruding wall 426 that is formed to protrude from an edge of the bottom wall 41 on the first vertical side wall 422a side in the X direction and extend in the Z direction toward a side opposite to the side where the side wall 42 rises upright. A surface of the protruding wall 426 on the opposite side to the second vertical side wall 422b in the X direction is formed flush with the outer surface of the first vertical side wall 422a. The connection electrode 33 (described later) is fixed to the surface of the protruding wall 426 on the opposite side to the second vertical side wall 422b in the X direction.

Electrical connection of the three capacitors 22 to each other, electrical connection of the capacitors 22 to the resistors 21, and electrical connection of the resistors 21 to the conductive wires 131 are respectively made via the connection electrode 33, the relay electrodes 32 and the electrodes with terminals 31 all of which are fixed on the case 4. In the present embodiment, the case 4 is formed by insert molding performed in such a manner that the electrodes with terminals 31, the relay electrodes 32 and the connection electrode 33 are placed inside a mold for molding the case 4 and a molten resin constituting the case 4 is injected into and cured in the mold. Each of the electrodes with terminals 31, the relay electrodes 32 and the connection electrode 33 is thereby integrated with the case 4 in a state in which it is embedded in the case 4 but a surface thereof is exposed. Each of the electrodes with terminals 31, the relay electrodes 32 and the connection electrode 33 is embedded in the case 4 by an amount equivalent to its thickness, and the surface exposed from the case 4 is substantially flush with the surface of the case 4. Alternatively, the electrodes with terminals 31, the relay electrodes 32 and the connection electrode 33 may be fixed to the case 4 by another method, e.g., press fitting, heat fusion or adhesive bonding, etc.

As shown in FIG. 6, the three electrodes with terminals 31 are connected to the lead wires 212a of the different resistors 21. The electrodes with terminals 31 have a shape formed by bending a long plate and are each formed such that a portion is located the second vertical side wall 422b on the outer side and the other portion is located on the bottom wall 41 on a side opposite to the side where the side wall 42 rises upright.

The terminal portion 311 is formed at one end of each of the three electrodes with terminals 31. The terminal portion 311 is not embedded in the case 4 and is led out of the case 4. As shown in FIG. 2, the three terminal portions 311 are respectively connected to the conductive wires 131 of the different wiring portions 13 (the U-phase wiring portion 13u, the V-phase wiring portion 13v and the W-phase wiring portion 13w). The three terminal portions 311 are aligned in the X direction. The three terminal portions 311 are bent into a U-shape so that openings are located on the same side in the X direction, and the conductive wires 131 of the wiring portions 13 are inserted into the openings.

Figure 10:
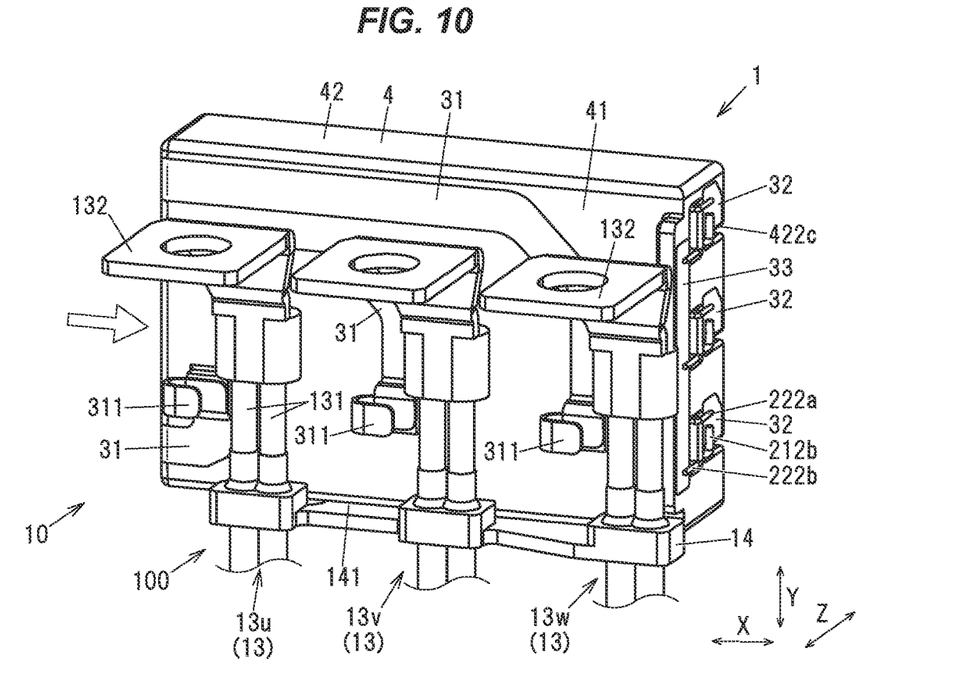
FIG. 10 is a perspective view showing a state before the surge suppression device is assembled to a wiring unit in the embodiment.
Figure 11:
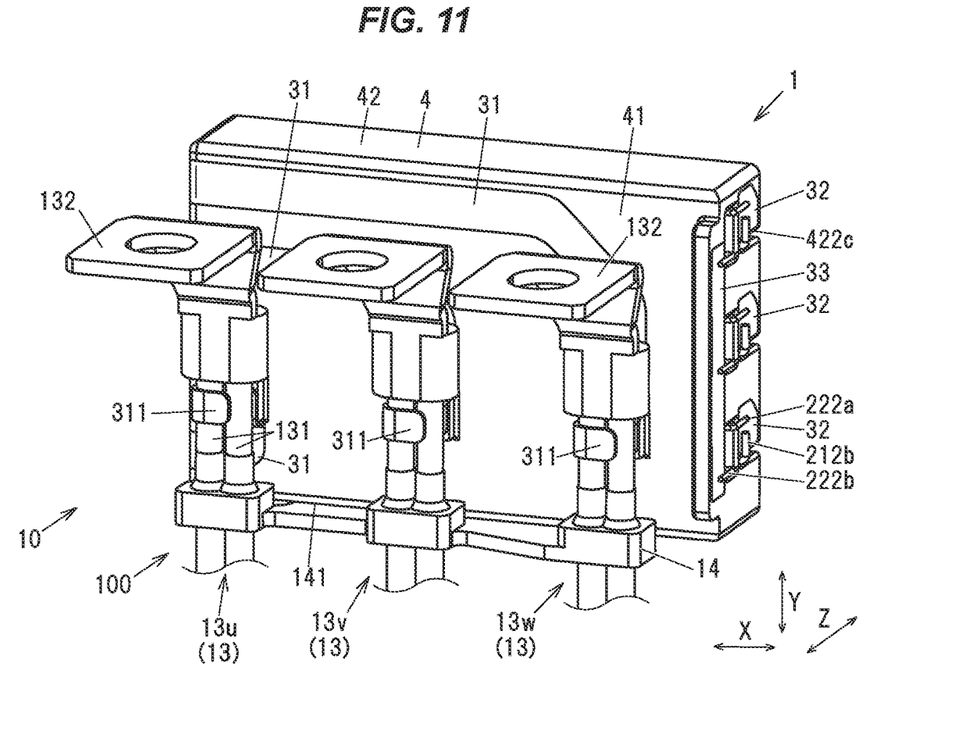
FIG. 11 is a perspective view showing a state after the surge suppression device is assembled to the wiring unit in the embodiment

FIG. 10 is a perspective view showing a state before the surge suppression device 1 is assembled to the wiring unit 100. FIG. 11 is a perspective view showing a state after the surge suppression device 1 is assembled to the wiring unit 100. When attaching the surge suppression device 1 to the wiring unit 100, firstly, the surge suppression device 1 is placed on the placement portion 141 so that the conductive wires 131 of the wiring portions 13, which are objects to be inserted, are positioned respectively adjacent to the electrodes with terminals 31 on the opening side, as shown in FIG. 10. Then, as shown in FIGS. 10 and 11, the surge suppression device 1 and the wiring unit 100 are moved relative to each other in opposite directions along the X-direction. This allows the conductive wires 131 of the wiring portions 13 for three phases to be inserted into the three terminal portions 311 at once. Therefore, in the present embodiment, the surge suppression device 1 can be easily retrofitted to the wiring unit 100. The terminal portions 311 may be joined to the conductive wires 131 by welding, etc., after the conductive wires 131 are inserted into the terminal portions 311. Meanwhile, as shown in FIG. 6, the three terminal portions 311 are arranged on end faces, on the protruding side, of three bottom wall raised portions 411 formed to protrude from the bottom wall 41. Thus, the three terminal portions 311 are located at a distance in the Z direction from a main surface of the bottom wall 41 on the opposite side to the side where the side wall 42 rises upright.

As shown in FIG. 6, respective end portions 312 of the three electrodes with terminals 31 on the opposite side to the terminal portions 311 are located close to the top sides (one side in the Y direction, e.g., the upper side in FIGS. 6 and 8) of the three lead-out recesses 422c formed on the second vertical side wall 422b. The opposite side to the upper side in the Y direction (e.g., the lower side in FIGS. 6 and 8) is referred to as the lower side. In this regard, the expression "upper" and "lower" are used for convenience of description and do not limit the posture with respect to the vertical direction when, e.g., the surge suppression device 1 is in use. The end portion 312 of the electrode with terminal 31 is connected to the lead wire 212a inserted into the lead-out recess 422c adjacent thereto. The three lead wires 212a respectively arranged in the three lead-out recesses 422c formed on the second vertical side wall 422b are all bent upward in a region outside the case 4, and portions above the bend are welded to the end portions 312 of the electrodes with terminals 31. As shown in FIGS. 5 and 8, the lead wires 212b of the resistors 21, which are located on a side where the capacitors 22 are connected, are connected to the relay electrodes 32.

Each relay electrode 32 is an electrode electrically relaying between the resistor 21 and the capacitor 22 in the series circuit 2 and is formed in a plate shape. Three relay electrodes 32 are formed on the first vertical side wall 422a on the outer side. The three relay electrodes 32 are formed at positions adjacent to the three capacitor placement recesses 425 on the opposite side to the protruding wall 426 in the Z direction. The three relay electrodes 32 are aligned in the Y direction and are arranged at positions respectively close to the top sides of the three lead-out recesses 422c formed on the first vertical side wall 422a.

The relay electrode 32 is connected to the lead wire 212b inserted into the lead-out recess 422c adjacent thereto. The three lead wires 212b respectively arranged in the three lead-out recesses 422c formed on the first vertical side wall 422a are all bent upward outside the case 4, and portions above the bend are welded to the relay electrodes 32.

The upper lead wires 222a of the capacitors 22 housed in the capacitor placement recesses 425 are also welded to the relay electrodes 32 adjacent thereto in the Z direction. The upper lead wires 222a of the capacitors 22 are bent toward the side opposite to the protruding wall 426 in the Z direction, and portions on the tip side relative to the bend are connected to the relay electrodes 32. Meanwhile, the lower lead wires 222b of the capacitors 22 are bent toward the protruding wall 426 in the Z direction, and portions on the tip side relative to the bend are connected to the connection electrode 33. That is, in the present embodiment, the pair of the lead wires 222a, 222b of the capacitor 22 are bent in the Z direction toward opposite sides to each other.

The connection electrode 33 is an electrode that electrically connects the lower lead wires 222b of the three capacitors 22 to each other. The connection electrode 33 is formed on the first vertical side wall 422a as well as the protruding wall 426 on the outer side. In addition, the connection electrode 33 is formed on the side opposite to the three relay electrodes 32 so that the three capacitor placement recesses 425 are sandwiched therebetween. In other words, the plural capacitors 22 are located between the connection electrode 33 and the plural relay electrodes 32. The connection electrode 33 is formed long in the Y direction so as to be adjacent to the respective lower lead wires 222b of the three capacitors 22 in the Z direction. Portions of the respective lower lead wires 222b of the three capacitors 22 on the tip side relative to the bend are connected to the connection electrode 33.

As described above, connection between the resistor 21 and the capacitor 22 in each series circuit 2 is made via the relay electrode 32, connection between the ends of the three series circuits 2 on the capacitor 22 side is made via the connection electrode 33, and connection between the ends of the three series circuits 2 on the resistor 21 side and the conductive wires 131 of the wiring portions 13 is made via the electrodes with terminals 31.

(Method for Manufacturing Surge Suppression Device 1)

An example of a method for manufacturing the surge suppression device 1 in the present embodiment will be described.

Firstly, the case 4 provided with the electrodes with terminals 31, the relay electrodes 32 and the connection electrode 33, the resistors 21 each having the pair of lead wires 212a, 212b bent into predetermined shapes, and the capacitors 22 each having the pair of lead wires 222a, 222b bent into predetermined shapes are prepared.

Next, the three resistors 21 are inserted into the three resistor placement recesses 424 of the case 4 in the Z direction and the three capacitors 22 are inserted into the three capacitor placement recesses 425 of the case 4 in the X direction. At this time, the resistor main bodies 211 are placed to be housed in the resistor placement recesses 424 while inserting the pairs of the lead wires 212a, 212b of the resistors 21 into the lead-out recesses 422c. Meanwhile, the capacitors 22 are arranged such that the capacitor main bodies 221 are housed in the capacitor placement recesses 425 and the pairs of the lead wires 222a, 222b are exposed from the capacitor placement recesses 425. In the state in which the three resistors 21 and the three capacitors 22 are arranged in the case 4, the lead wires 212a of the resistors 21 face the electrodes with terminals 31, the lead wires 212b of the resistors 21 and the lead wires 222a of the capacitors 22 face the relay electrodes 32, and the lead wires 222b of the capacitors 22 face the connection electrode 33.

Next, the lead wires 212a of the resistors 21 are welded to the electrodes with terminals 31, the lead wires 212b of the resistors 21 and the lead wires 222a of the capacitors 22 are welded to relay electrodes 32, and the lead wires 222b of the capacitors 22 are welded to the connection electrode 33. The surge suppression device 1 is thereby obtained.

Functions and Effects of the Embodiment

In the surge suppression device 1 of the present embodiment, the three series circuits 2 each having the resistor 21 and the capacitor 22 are assembled to the case 4. Furthermore, the respective ends of the three series circuits 2 on the capacitor 22 side are electrically connected to each other via the connection electrode 33 provided on the case 4. Therefore, positioning between the three capacitors 22, the case 4, and the connection electrode 33 are done to some extent by assembling the three capacitors 22 to the case 4, and connection work between the lead wires 222b of the capacitors 22 and the connection electrode 33 can be performed in such a state. It is thereby possible to improve productivity of the surge suppression device 1.

In addition, the respective ends of the three series circuits 2 on the resistor 21 side are electrically connected to the electrodes with terminals 31 that are provided on the case 4 and have the terminal portions 311 connected to the external conductive wires 131. Therefore, for example, it is not necessary to form the lead wires 212a of the resistors 21 into a special shape and it is possible to easily connect the resistors 21 to the conductive wires 131 via the electrodes with terminals 31. In addition, by adopting a configuration in which the lead wires 212a of the resistors 21 are connected to the electrodes with terminals 31 provided on the case 4, work of electrical connection between the lead wires 212a of the resistors 21 and the electrodes with terminals 31 can be performed in the state in which the resistors 21 are positioned relative to the case 4 to some extent and it is thereby possible to improve productivity of the surge suppression device 1.

In addition, the terminal portions 311 of the three electrodes with terminals 31 are aligned in the X direction and are bent so that openings are located on the same side in the X direction. Therefore, by moving the wiring unit 100 and the surge suppression device 1 relative to each other in the X direction so that the three wiring portions 13 are inserted into the openings of the three terminal portions 311 as described above, it is possible to easily connect the three terminal portions 311 to the three wiring portions 13.

In addition, in each of the three series circuits 2, the resistor 21 and the capacitor 22 are electrically connected via the relay electrode 32 provided on the case 4. Therefore, by connecting the resistors 21 and the capacitors 22 to the relay electrodes 32 provided on the case 4 in the state in which the resistors 21 and the capacitors 22 are positioned relative to the case 4 to some extent, it is possible to easily electrically connect the resistors 21 to the capacitors 22, and as a result, it is possible to improve productivity of the surge suppression device 1.

In addition, the three capacitors 22 are arranged in the case 4 so as to be aligned in the Y direction, the connection electrode 33 is formed long in the Y direction, and the three relay electrodes 32 are aligned in the Y direction. Then, the three capacitors 22 are arranged at positions between the connection electrode 33 and the three relay electrodes 32. With this configuration, connection of three capacitors 22 to the connection electrode 33 and the three relay electrodes 32 can be realized in a small space even though each of the three capacitors 22 is arranged such that one of the pair of lead wire 222a, 222b is connected to one of the three relay electrodes 32 and the other is connected to the connection electrode 33.

In addition, the case 4 has the lead-out recesses 422c through which the respective lead wires 212a, 212b of the three resistors 21 arranged on the case 4 pass and extend out of the case 4. Connection work between the lead wires 212a, 212b of the resistors 21 to other parts is difficult if it is performed in the case 4, but this configuration allows the lead wires 212a, 212b of the resistors 21 to easily extend out of the case 4.

As described above, according to the present embodiment, it is possible to provide a surge suppression device and a motor wiring component which can improve productivity.

Modifications of the Embodiment

Although the example in which the wiring unit 100 includes the wiring portions 13u-13w for three phases has been described in the embodiment, it is not limited thereto, and the wiring unit 100 may have wiring portions for two phases. In this case, the surge suppression device 1 has two series circuits 2.

In addition, the case 4 may be made of a metal. In this case, the electrodes with terminals 31, the relay electrodes 32 and the connection electrode 33 are insulated from the case 4.

In addition, for example, the lead wires 212b of the resistors 21 can be directly connected to the lead wires 222a of the capacitors 22 by welding, etc., without through the relay electrodes 32. Likewise, the lead wires 212a of the resistors 21 can be connected to the conductive wires 131 of the wiring without through the electrodes with terminals 31. In this case, the lead wire 212a of the resistors 21, together with the conductive wires 131, may be crimped to the barrel 132a of the wiring terminal 132.

Summary of the Embodiment

Technical ideas understood from the embodiment will be described below citing the reference signs, etc., used for the embodiment. However, each reference sign, etc., described below is not intended to limit the constituent elements in the claims to the members, etc., specifically described in the embodiment.

[1] A surge suppression device (1), comprising: a plurality of series circuits (2) each comprising a resistor (21) and a capacitor (22); and a case (4) in which a plurality of the resistors (21) and a plurality of the capacitors (22) are placed, wherein respective ends of the plurality of series circuits (2) on the capacitor (22) side are electrically connected to each other via a connection electrode (33) provided on the case (4).

[2] The surge suppression device (1) defined by [1], wherein an end of each of the plurality of series circuits (2) on a side opposite to the side connected to the connection electrode (33) is electrically connected to an electrode with terminal (31) being provided on the case (4) and comprising a terminal portion (311) connected to an external conductive wire (131).

[3] The surge suppression device (1) defined by [2], wherein the terminal portions (311) of a plurality of the electrodes with terminals (31) are aligned in a terminal alignment direction (X) and are bent so that openings are located on the same side in the terminal alignment direction (X).

[4] The surge suppression device (1) defined by any one of [1] to [3], wherein in each of the plurality of series circuits (2), the resistor (21) and the capacitor (22) are electrically connected via a relay electrode (32) provided on the case (4).

[5] The surge suppression device (1) defined by [4], wherein the plurality of capacitors (22) are arranged in the case (4) so as to be aligned in one direction (Y), wherein the connection electrode (33) is formed long in the one direction (Y), wherein a plurality of the relay electrodes (32) are aligned in the one direction (Y), and wherein the plurality of capacitors (22) are arranged at positions between the connection electrode (33) and the plurality of relay electrodes (32).

[6] The surge suppression device (1) defined by any one of [1] to [5], wherein the case (4) comprises lead-out recesses through which respective lead wires (212a, 212b) of the plurality of resistors (21) arranged in the case (4) pass and extend out of the case (4).

[7] A wiring component (10) for motor to supply an alternating current to a motor (11), the wiring component (10) for motor comprising: a plurality of conductive wires (131) connected to stator coils (112d) of the motor (11); wiring terminals (132) that are provided at ends of the plurality of conductive wires (131) on a side opposite to the side connected to the stator coils (112d) and are connected to electrodes (113b) of a terminal block (113); and a surge suppression device (1) to suppress application of overvoltage to the motor (11), wherein the surge suppression device (1) comprises a plurality of series circuits (2) each comprising a resistor (21) and a capacitor (22), and a case (4) in which a plurality of the resistors (21) and a plurality of the capacitors (22) are placed, wherein respective ends of the plurality of series circuits (2) on the resistor (21) side are respectively electrically connected to the conductive wires (131) for respective phases, and wherein respective ends of the plurality of series circuits (2) on the capacitor (22) side are electrically connected to each other via a connection electrode (33) provided on the case (4).

Additional Note

Although the embodiment of the invention has been described, the invention according to claims is not to be limited to the embodiment described above. Further, please note that not all combinations of the features described in the embodiment are necessary to solve the problem of the invention. In addition, the invention can be appropriately modified and implemented without departing from the gist thereof.

The invention claimed is:

1. A surge suppression device, comprising:
   a plurality of series circuits each comprising a resistor and a capacitor; and
   a case in which a plurality of the resistors and a plurality of the capacitors are placed,
   wherein respective ends of the plurality of series circuits on the capacitor side are electrically connected to each other via a connection electrode provided on the case,
   wherein an end of each of the plurality of series circuits on a side opposite to the side connected to the connection electrode is electrically connected to an electrode with terminal being provided on the case and comprising a terminal portion connected to an external conductive wire, and
   wherein the terminal portions of a plurality of the electrodes with terminals are aligned in a terminal alignment direction and are bent so that openings are located on the same side in the terminal alignment direction.

2. The surge suppression device according to claim 1,
   wherein the case comprises lead-out recesses through which respective lead wires of the plurality of resistors arranged in the case pass and extend out of the case.

3. A surge suppression device, comprising:
   a plurality of series circuits each comprising a resistor and a capacitor; and
   a case in which a plurality of the resistors and a plurality of the capacitors are placed,
   wherein respective ends of the plurality of series circuits on the capacitor side are electrically connected to each other via a connection electrode provided on the case,
   wherein in each of the plurality of series circuits, the resistor and the capacitor are electrically connected via a relay electrode provided on the case.

4. The surge suppression device according to claim 3,
   wherein the plurality of capacitors are arranged in the case so as to be aligned in one direction, wherein the connection electrode is formed long in the one direction, wherein a plurality of the relay electrodes are aligned in the one direction, and wherein the plurality of capacitors are arranged at positions between the connection electrode and the plurality of relay electrodes.

5. A motor wiring component to supply an alternating current to a motor, the motor wiring component comprising:

a plurality of conductive wires connected to stator coils of the motor, wiring terminals that are provided at ends of the plurality of conductive wires on a side opposite to the side connected to the stator coils and are connected to electrodes of a terminal block; and a surge suppression device to suppress application of overvoltage to the motor, wherein the surge suppression device comprises a plurality of series circuits each comprising a resistor and a capacitor, and a case in which a plurality of the resistors and a plurality of the capacitors are placed, wherein respective ends of the plurality of series circuits on the resistor side are respectively electrically connected to the conductive wires for respective phases, and wherein respective ends of the plurality of series circuits on the capacitor side are electrically connected to each other via a connection electrode provided on the case, and wherein in each of the plurality of series circuits, the resistor and the capacitor are electrically connected via a relay electrode provided on the case.

\* \* \* \* \*